March 23, 1926.  
B. R. HOLLOWAY  
CHICKEN CARRIER TRUCK  
Filed Oct. 3, 1922
1,577,639
2 Sheets-Sheet 1
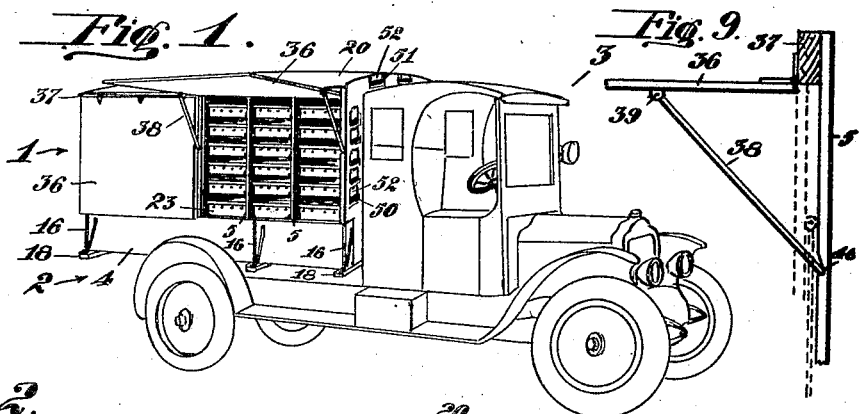
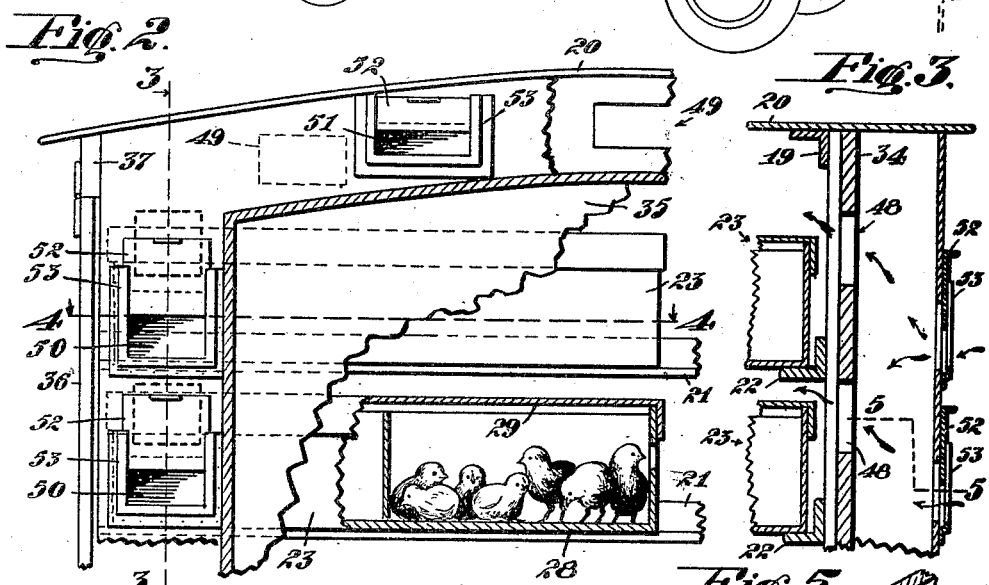
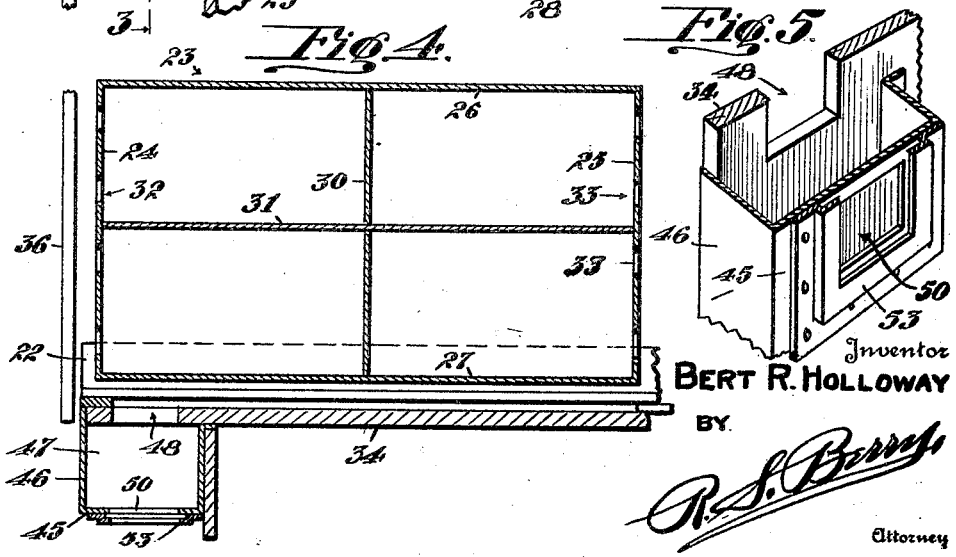
Inventor  
BERT R. HOLLOWAY  
BY  
Attorney March 23, 1926.                                                    1,577,639
B. R. HOLLOWAY
CHICKEN CARRIER TRUCK
Filed Oct. 3, 1922                         2 Sheets-Sheet 2
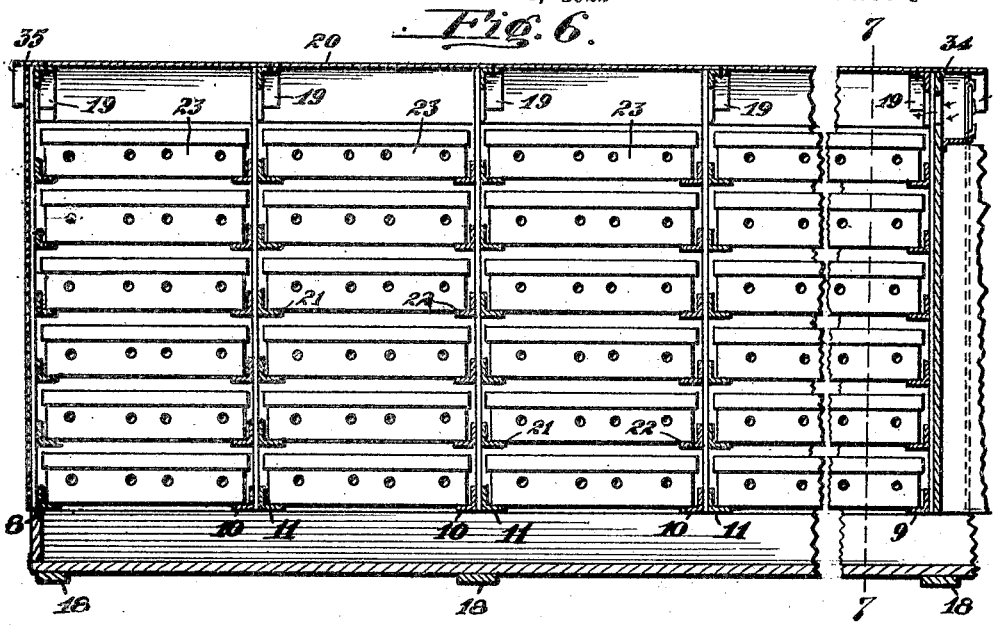
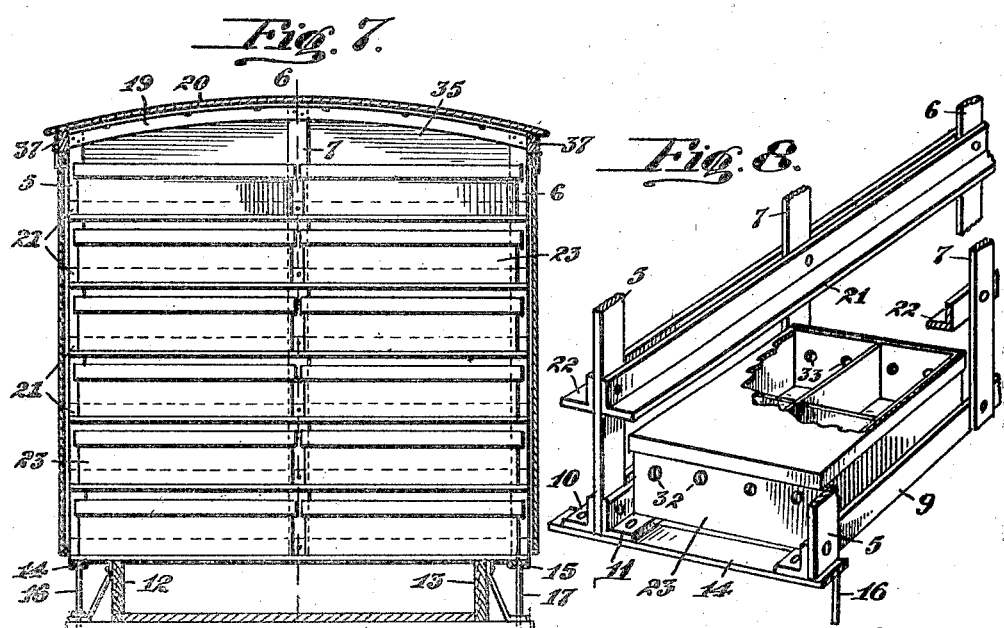
Inventor
BERT R. HOLLOWAY Patented Mar. 23, 1926.

1,577,639

UNITED STATES PATENT OFFICE.

BERT R. HOLLOWAY, OF VAN NUYS, CALIFORNIA.

CHICKEN-CARRIER TRUCK.

Application filed October 3, 1922. Serial No. 592,107.

*To all whom it may concern:*

Be it known that I, BERT R. HOLLOWAY, a citizen of the United States, residing at Van Nuys, in the county of Los Angeles and State of California, have invented new and useful Improvements in Chicken-Carrier Trucks, of which the following is a specification.

My invention relates to chicken carriers; and consists of the novel features herein shown, described and claimed.

My principal object is to make a carrier to be mounted on a truck for easily handling and transporting live chickens in quantities.

Another object is to make a carrier adapted to be mounted on a truck and adapted to receive a quantity of chicken containers.

Another object is to provide adequate ventilation for a chicken carrier adapted to handle a large quantity of live chickens.

My invention is illustrated in the accompanying drawing, in which:

Figure 1 is a view in perspective of a chicken carrier, mounted on a truck, in accordance with the principles of my invention.

Fig. 2 is a fragmentary view partly in section showing the front end of the carrier.

Fig. 3 is a view in section as seen on the line 3—3 of Figure 2.

Fig. 4 is a view in section as seen on the line 4—4 of Figure 2.

Fig. 5 is a view in sectional perspective as seen on the line 5—5 of Figure 3 showing the ventilator construction.

Fig. 6 is a view in longitudinal section of the carrier as seen on the line 6—6 of Figure 7.

Figure 7 is a view in cross section as seen on the line 7—7 of Figure 6.

Figure 8 is a detail in perspective showing the manner of constructing the carrier frame and mounting the chicken containers thereon.

Fig. 9 is a detail of a closure panel support.

Fig. 10 is a detail illustrating the construction of a closure panel.

Referring to the drawings in detail:

The chicken carrier 1 is adapted to be mounted upon a truck 2 behind the cab 3 and is supported on the truck body 4.

The carrier comprises a frame structure which embodies a series of spaced side posts 5 and 6 and intermediate posts 7, here shown as formed of strap iron. The posts 5 are arranged at suitable intervals apart, along one side of the frame and the posts 6 and 7 are aligned therewith transversely of the frame. The posts 5 and 6 forming the corners of the frames are connected together at their lower ends by transverse angle irons 8 and 9, and the intermediate side posts 5 and 6 are connected by a pair of transverse angle irons 10 and 11 arranged on opposite sides of the posts. The angle irons 8, 9, 10, and 11 form the base member of the frame and seat upon the side panels 12 and 13 of the truck body 4 with their ends projecting beyond outer faces of the side panels of the truck body and are here shown as tied together at their ends by tie-bars 14 and 15 which are secured to the truck body by means of bolts 16 and 17 extending through the tie-bars and engaging the ends of cross pieces 18 forming part of the truck body. The intermediate posts 7 are also secured at their lower ends to the angle iron rails 8, 9, 10, and 11. The upper ends of the aligned posts 5, 6, and 7 are here shown as connected by curved angle irons 19, carrying a suitable roof structure 20 which ties the upper ends of the posts throughout the frame structure. A series of angle irons 21 and 22 are arranged on the adjacent faces of each set of posts 5, 6, and 7 and are disposed horizontally in spaced relation thereon to form slide-ways adapted to receive chicken containers 23 whereby a series of the containers may be supported in superposed spaced relation. Each of the containers comprises a box like structure having end walls 24 and 25, side walls 26 and 27, a bottom wall 28 and a cover 29; the interior of the container being divided into several compartments by cross partitions 30 and 31. The end walls 24 and 25 of the container are formed with vent apertures 32 and 33 to permit the flow of air through the container. The containers are designed to be inserted from the sides of the carriers and may be readily removed and replaced. The front and rear ends of the carrier frame are closed by walls 34 and 35 and the sides of the carrier between the end walls are fitted with closures 36 hinged at the upper edges to rails 37 to swing vertically; bars 38 being pivoted at 39 on the ends of the closure panels and adapted when the panels are disposed in a substantially horizontally open position as shown in Figs. 1, and 9, to be engaged at their lower ends in recesses 40 formed in the side posts whereby the panel may be supported to permit ready access to the interior of the carrier. The bars 39 are adapted to swing to a dependent position when the panels are in a closed position as indicated in dotted lines in Figure 9. The panels may be of any desired construction but are preferably formed as shown in Fig. 10, of wire netting 41 carried on a frame 42 and covered with canvas 43 or other suitable material to provide a light construction. The closure panels serve to protect the contents of the container from the elements but are adapted when in their closed position to be slightly spaced at their ends from the frame structure to afford ingress or egress of air currents. The panels may be fastened in their closed position by any suitable means not necessary to be here shown.

As a means for affording ventilation to the carrier and by which currents of air may be directed into the carrier at suitable points through the front end of the latter, the carrier is provided with a ventilating structure at its forward end. This structure embodies a front wall 45 spaced from the carrier end wall 34 and extending from the sides of the cam 3 and from the top thereof; the upper portion of the wall 45 above the top of the cab meeting a projecting portion of the roof 20 and the side edges of the wall 45 connecting with an inturned side wall 46 connecting with the front end panel 34. In this manner an air passage 47 is provided which extends upwardly along the sides of the cab and across the top thereof. Leading from the vertical portions of air passage 47 through the panel 34 are air outlets 48 which open to the spaces between the superposed slide-ways, as shown in Fig. 3, and formed in the end panel adjacent the roof are outlets 49 which lead from the air passage 47 into the space above the top layer of containers. Formed in the ventilator panel 45 is a series of air inlet openings 50 which are offset relative to the air outlets 48, there also being air inlet openings 51 formed in the upper portion of the panel offset relative to the outlets 49. The inlets 50 and 51 are fitted with slide panels 52 mounted in slideways 53 and adapted to be positioned to vary the area of the air inlets, the panels being frictionally engaged in the guide ways whereby they may be maintained in various adjusted positions.

By the construction and arrangement hereinbefore described I have provided a practical means for transporting live chicks in large numbers, as the rack structure is capable of holding a series of stacks of chick containers with each container, by being divided into several compartments, adapted to hold, for example, approximately a hundred chicks. The structure is here shown as providing for six stacks of six containers each on each side of the structure whereby a total of seventy two containers may be placed in the carrier, which affords a capacity of approximately seventy two hundred chicks in the carrier as here shown, which capacity, however, may be increased or diminished as occasion requires. By separating and spacing the containers both horizontally and vertically a free flow of air around the containers throughout the carrier is afforded, which, by forming the containers with the vent openings, insures removal of ventilated air and a supply of fresh air, which is essential to preservation of the chicks. The ventilators at the forward end of the carrier provide means for regulating the inflow of air to the carrier; the slide panels 52 being adjusted to vary the extent of opening of the intakes 50 and 51 which are regulated according to varying conditions, such as; the temperature of the atmosphere and average speed of travel of the truck. It is evident that as the truck advances, air currents will be directed into the carrier through the intakes, which currents will be broken up by the wall 34, which wall will serve as a baffle because of the openings 48 leading into the carrier being disposed out of alignment with the intake openings and thereby providing wall surfaces opposite the intake openings.

By arranging the containers in spaced relation the individual containers may be removed and replaced without disturbing the others, thus faciliating delivery of the chicks.

By the use of my invention I am able to transport large numbers of young chicks long distances with practically no loss of chicks as the chicks will be protected against extreme temperatures and crowding and will be properly supplied with fresh air.

While I have shown and described a specific embodiment of my invention I do not limit myself to the exact details of construction shown but may employ such changes and modifications of parts and their arrangement as come within the scope of appended claims.

I claim:

1. In a chicken carrier truck, a truck body, a series of superposed slide-ways carried on the truck body opening to the opposite sides thereof, a roof entending over the slide-ways, spaced walls at the forward end of the slide-ways forming an air passage, the innermost of said walls being formed with a series of superposed spaced air outlets opening to the spaces between the slide-ways and the outermost of said walls being formed with a series of superposed spaced air inlets opening to the air passages at points offset relatively to the air outlets, there being an air inlet adjacent each of the air outlets, and means for varying the extent of opening of the air inlets.

2. In a chicken carrier truck, a truck body, a series of superposed slide-ways carried on the truck body and opening to the opposite sides thereof, a roof extending over the slide-ways, spaced walls at the forward end of the spaced slide-ways forming an air passage therebetween, the innermost of said walls being formed with a series of superposed spaced air outlets opening to the spaces between the superposed slide-ways and having air outlets opening to a space immediately beneath the roof above the slide-ways; the outermost of said wall being formed with a series of air inlets opening to the air passage, there being an air inlet adjacent each air outlet offset relatively thereto, and means for varying the extent of opening of the air inlets.

BERT R. HOLLOWAY.